Aug. 9, 1949.   D. HEYER   2,478,870
VARIABLE RATIO TRANSMISSION
Filed April 7, 1944   4 Sheets-Sheet 1

Inventor:
DON HEYER,
Attorney.

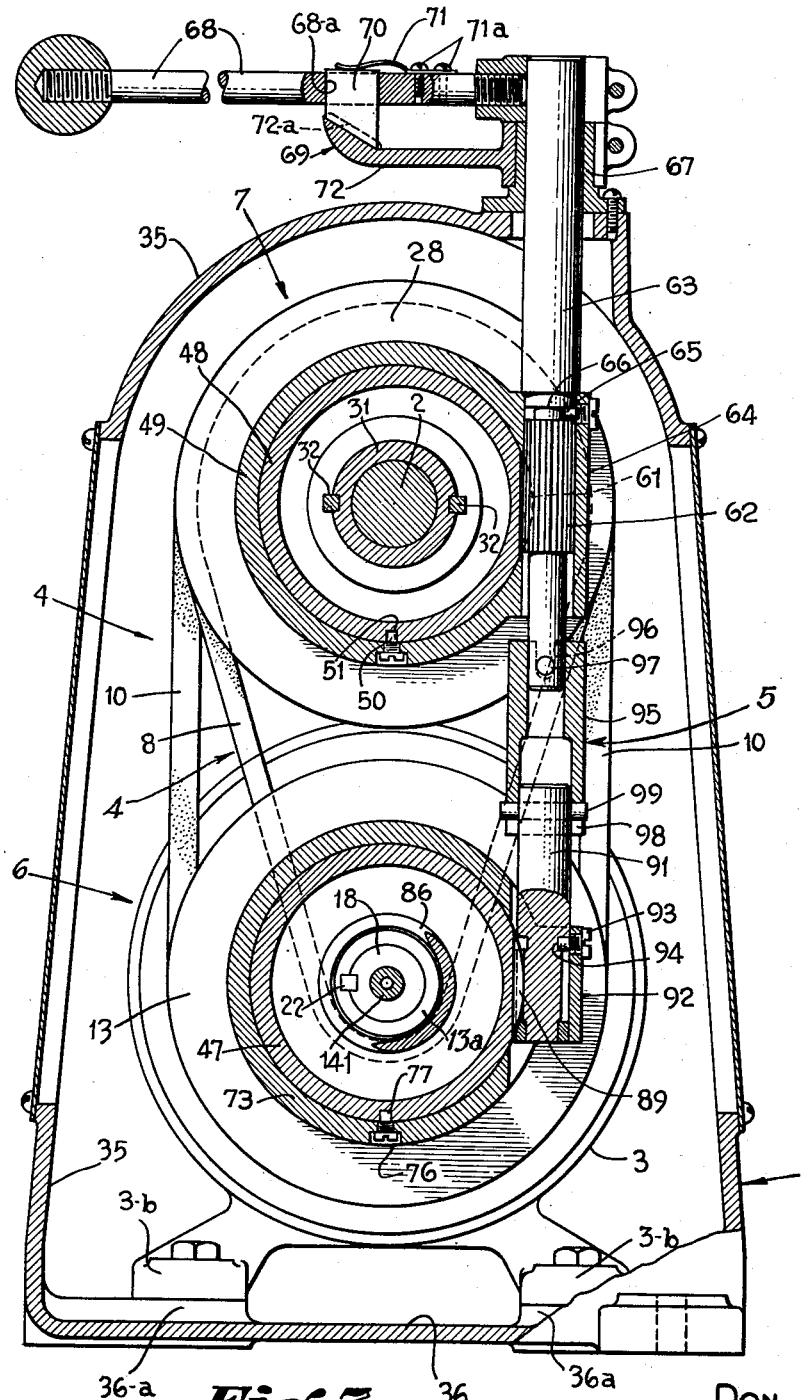

Aug. 9, 1949.  D. HEYER  2,478,870
VARIABLE RATIO TRANSMISSION

Filed April 7, 1944  4 Sheets-Sheet 4

Inventor:
DON HEYER,
*[signature]*
Attorney.

Patented Aug. 9, 1949

2,478,870

UNITED STATES PATENT OFFICE 2,478,870

VARIABLE RATIO TRANSMISSION

Don Heyer, Los Angeles, Calif., assignor to International Powermatic Corporation, Los Angeles, Calif.

Application April 7, 1944, Serial No. 529,923

7 Claims. (Cl. 74—230.17)

1

This invention relates to a variable ratio transmission.

It is an object of this invention to improve in general the construction and arrangement of such transmissions.

It is another object of this invention to provide improved mechanism for adjusting the ratio of such transmissions.

It is another object of this invention to provide a variable ratio transmission wherein the effective diameters of the cooperating pulleys are simultaneously varied in opposite senses, with improved control mechanism for adjusting the effective pulley diameters.

It is another object of this invention to provide a variable ratio transmission, and particularly one in which the effective diameter of both the driving and the load driving elements of the transmission are formed as units for ready assembly on a supporting frame to constitute a complete transmission for ready disassembly for repair or replacement.

It is another object of this invention to provide a variable ratio transmission adapted to utilize a standard type of motor to form an adjustable speed power unit without modification of the motor or the provision of special parts therein.

It is another object of this invention to provide adjusting mechanism for a variable diameter pulley structure wherein need of accurate alignment between such mechanism and the pulley is obviated.

It is another object of this invention to provide a spring pressed variable diameter pulley structure wherein the tension exerted by the spring is maintained substantially constant for all adjusted diameters of the pulley.

It is another object of this invention to provide a wide range variable ratio transmission including differential gearing wherein the driven load may be optionally driven from either side of the transmission.

It is another object of this invention to provide a wide range variable ratio transmission including a gearing unit of improved form.

It is another object of this invention to provide a wide range variable speed power unit of improved construction whereby a more compact unit is possible.

It is another object of this invention to provide a wide range variable ratio transmission including a gearing unit wherein a novel pulley arrangement is provided for operating the gearing.

This invention possesses many other advantages, and has other objects which may be made more easily apparent from a consideration of one embodiment of the invention. For this purpose there is shown a form in the drawings accompanying and forming part of the present specification. This form will now be described in detail, illustrating the general principles of the invention; but it is to be understood that this detailed description is not to be taken in a limiting sense, since the scope of the invention is best defined by the appended claims.

In the drawings:

Figure 3 is a transverse section of an enlarged scale, taken on line 3—3 of Figure 1;

Figure 1:
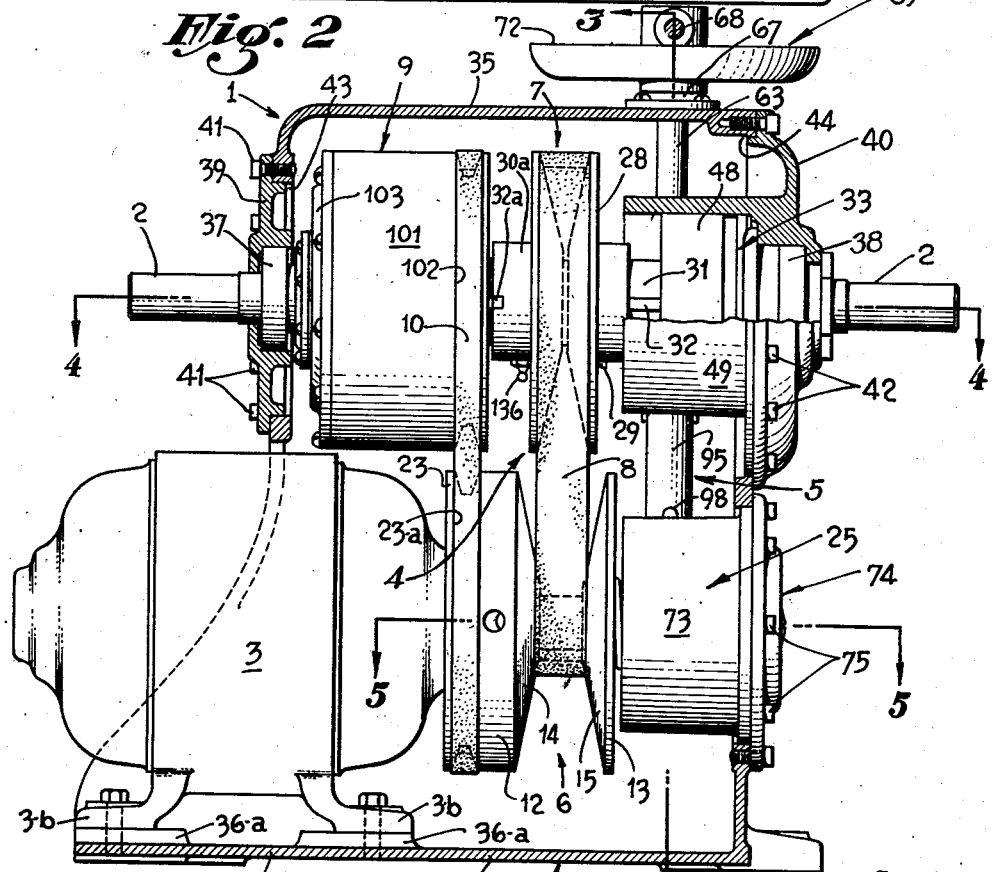
Figure 1 is a vertical section through a variable speed power unit incorporating the invention.

As shown in Figure 1, the power unit comprises a frame 1 rotatably supporting a load driving shaft 2 as well as mounting an electric motor 3 which drives the shaft 2 by means of the variable ratio transmission 4, means 5 including a manually operable lever being provided for varying the transmission ratio. The transmission 4 is shown as comprising a pair of adjustable diameter pulley structures 6 and 7 operatively connected by a belt 8 and respectively on the motor shaft and load driving shaft 2. Furthermore, to give a wide range to the speed reduction between the motor 3 and the shaft 2, a differential gear set 9 is interposed between the pulley 7 and drive shaft, and is operated by the motor 3 through a supplemental belt 10.

Referring in detail to the mechanism, driving pulley structure 6 comprises an axially fixed pulley section 12 and an axially movable pulley section 13, these pulley sections having opposed oppositely inclined faces 14 and 15 for respectively engaging the edges of an edge-active or V-belt 8. Pulley sections 12 and 13 are mounted on a sleeve or shaft extension 18 which is detachably secured on the shaft 3—a of the motor 3 as by a key 19 and a set screw 20 passing through the hub 12—a of the pulley section 12. In this manner, the pulley structure 6 as a unit may be mounted on, or removed from the motor shaft 3—a. The pulley sections 12 and 13 are constrained to rotate with the sleeve 18 by being splined thereon, as by a long key 22. As is well understood in such pulley structures, the belt tension causes the belt to have a wedging action which urges the pulley sections apart reducing the effective pulley diameter, and means generally indicated by 25 are provided for opposing separation of the pulley sections. In this way the effective diameter of the pulley structure 6 is controlled. The axially fixed pulley section 12 has a cylindrical extension 23 provided with a V-groove 23—a, forming a fixed diameter pulley 24 for engaging the supplemental belt 10. By forming the pulley 24 on the pulley section 12 in this manner, it is possible to position the belts 8 and 10 more closely than would be possible with separate pulley structures, thus reducing the axial length of the drive. Also, as clearly indicated in Figure 5, it is possible for the pulley 24 to partly overhang the motor 3, further reducing such axial length.

Pulley structure 7 similarly comprises an axially fixed section and an axially adjustable section. In order to maintain the belt 8 in alignment as the pulley diameters are adjusted, the fixed section of the pulley structure 7 must engage the side of the belt 8 opposite to that engaged by the fixed section 12 of the pulley structure 6. Thus, section 28 of the pulley structure 7 is splined to rotate with the sleeve 31 rotatably carried on the load driving shaft 2, as by a pair of long keys 32, and is axially fixed on sleeve 31, as by a set screw 29. The sleeve 31 connects the pulley structure 7 with the load driving shaft 2 through the gearing 9 for providing a variation in speed between the pulley 7 and the shaft 2 as will be more fully explained presently. The sleeve 31 is substantially axially fixed with respect to the shaft 2, and is without effect as far as the pulley structure 7 is concerned. Means indicated by 33 are provided as before to determine the relative positions of the pulley sections.

A casing or frame 35 is provided for supporting and substantially enclosing the transmission and supporting the motor 3 to form a unitary structure. Thus, the frame 35 is provided with a lower floor or shelf 36 having pads 36—a for supporting the motor 3 by its usual base members 3—b. This manner of mounting is of considerable importance, since it permits the use of a stock motor of appropriate size without the necessity of any changes whatever in the motor construction. The load driving shaft 2 is supported above the motor 3 by anti-friction bearings 37 and 38 respectively adjacent the opposite ends of the shaft 2 appropriately mounted in plates or cover forming members 39 and 40 which are detachably secured to the casing 35 as by bolts 41 and 42 to close openings 43 and 44 at opposite ends of the casing 35. The opening 44 adjacent the control mechanism 33 is of such size as to permit free passage of the pulley structure 7 and the gear set 9. Thus, the cover 40, together with the shaft 2, pulley structure 7 and the gearing 9, may be removed as a unit from the frame 35.

The control means 25 and 33 are quite similar and respectively include adjusting members or cups 47 and 48 guided for axial movement with respect to the associated pulley structure 6 or 7 as the case may be and suitably connected to the axially movable section of such pulley structure. Since such movable sections are on opposite sides of the belt 8, movement of both sections in the same direction serves to increase the effective diameter of one pulley structure and to decrease the effective diameter of the other pulley structure, which is as required. Accordingly, mechanism is provided for simultaneously moving the adjusting cups 47 and 48 in the same direction.

Figure 4:
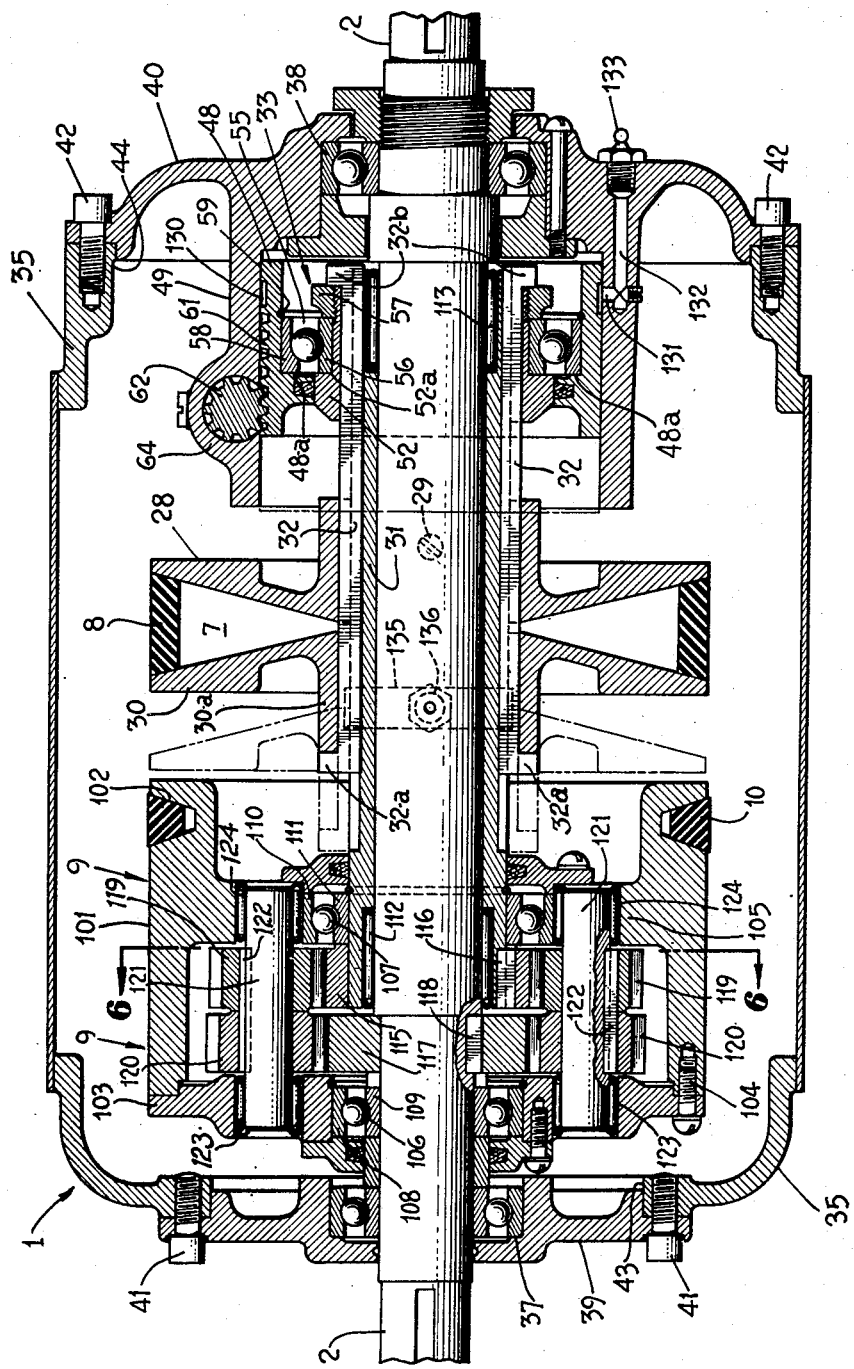
Figures 4 and 5 are cross sections on a further enlarged scale, taken on correspondingly numbered lines of Figure 1; and, Figure 6 is a vertical section taken on line 6—6 of Figure 4.

Referring to Figures 3 and 4, the adjusting cup 48 is shown as generally cylindrical and is slidably mounted in a suitable guide 49 formed integrally with cover 40 and extending into the casing 35. Guide 49 is coaxial with the shaft 2, and is provided with a screw 50 (Figure 3) engaging an axially extending slot 51 on the exterior of the cup 48 for restraining the cup 48 against rotation. A mandrel 52 is slideably mounted on the sleeve 31 near one end thereof and is constrained to rotate therewith by the keys 32 passing through the sleeve. The keys 32 each have heads 32—a on their corresponding ends, adapted to engage the outer end of the hub 30—a of the movable pulley section 30. The opposite ends of the keys 32 have similar heads 32—b which engage the outer end of the mandrel 52. The arrangement is such as to restrict movement of the pulley section 30 away from the mandrel 52 in response to the wedging action of the belt 8 between the sections 28 and 30. Since the section 28 is axially fixed, the position of the mandrel 52 serves in this manner to determine the relative axial positions of pulley sections 28 and 30 and hence the effective diameter of pulley structure 6.

The adjusting cup 48 serves to position the mandrel 52, being coupled thereto for this purpose by a thrust bearing 55, the inner race 56 of which is secured on the mandrel 52 as by being clamped against a shoulder 52—a thereon by a nut 57. The outer race 58 of the bearing 55 is mounted within the cup 48, a snap ring 59 serving to secure it against a shoulder 48—a. A portion of the exterior of the cup 48 has a rack 61 formed thereon for engagement by a pinion 62 formed on an adjusting shaft 63 which extends transversely of the load driving shaft 2 and is rotatably supported in a boss 64 formed integrally with the guide 49. As a means of supporting the shaft 63 axially, a screw 65 is threaded through the boss 64 and engages a reduced portion 66 of the shaft 63. The shaft 63 extends upwardly through a suitable bearing 67 on the upper part of the frame 35 and has an operating handle or lever 68 secured thereon, suitable detent mechanism 69 being provided for releasably holding the lever 68 and parts operated thereby in adjusted position.

Figure 2:
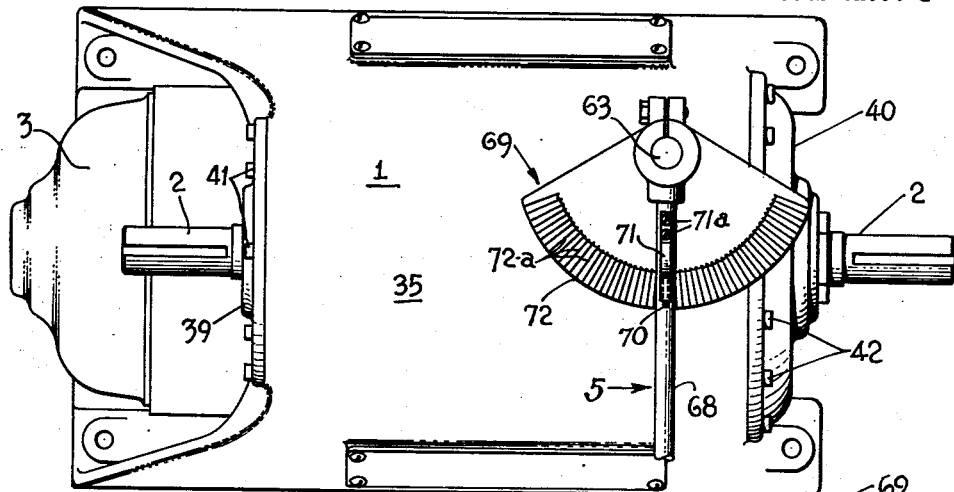
Figure 2 is a top plan view thereof.

As shown in Figures 2 and 3, the lever 68 has a vertical slot 68—a in which a blade or detent member 70 of thin resilient material such as spring steel is freely slideable, being urged downwardly as by a leaf spring 71 secured on the lever 68 as by screws 71—a into engagement with the upwardly directed serrations or teeth 72—a on a quadrant 72 secured to the exterior of the bearing 67 as by being clamped thereabout.

Figure 5:
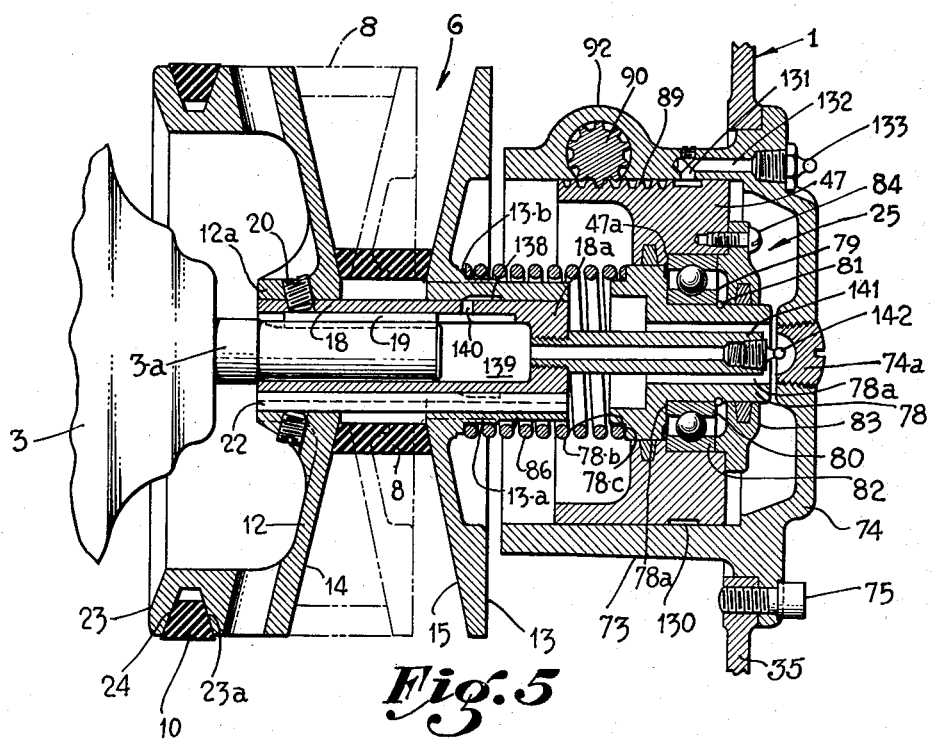

Referring to Figures 3 and 5, the adjusting cup 47 is also cylindrical and is slideably mounted in the guide means 73 formed integrally with a cover or support member 74 and extending into the casing 35, member 74 being detachably secured to frame or casing 35 as by bolts 75. The guide 73 is substantially coaxial with the motor shaft 3—a and pulley structure 6, a screw 76 being threaded through the guide 73 and engaging a slot 77 in the cup 47 for preventing rotation of the cup. A mandrel 78 is rotatably supported in the cup 47 by an anti-friction thrust bearing 79, the inner race 80 of which is secured against a shoulder 78—a on the mandrel 78 as by a snap ring 81. The outer bearing race 82 is secured in the cup 47 as by being confined between a shoulder 47—a in the cup and a retaining plate 83 attached to the cup 47 by screws 84. In this way the mandrel 78 is axially fixed but freely rotatable in the cup 47.

A compression spring 86 is provided for operatively connecting the mandrel 78 with the movable pulley section 13, whereby the position of the adjusting cup 47 determines the relative axial positions of the pulley sections 12 and 13 and hence the effective diameter of pulley structure 6. The spring 86 is supported on a reduced portion 78—b of the mandrel 78 and hub 13—a of the pulley section 13 being confined between the shoulder 78—c on the mandrel and shoulder 13—b on the pulley section 13.

The use of this spring has several important advantages. Thus, it permits substantial misalignment between the shaft 3—a and the mandrel 78. This is quite necessary if stock motors are to be used, since the tolerances in such motors from supporting surface of the base or feet 3—b and the center of the shaft 3—a are as great as 1/64 of an inch or possibly more. This would prohibit the use of a rigid connection between the adjusting cup 47 and the pulley section 13 without elaborate fitting and shimming, but by the use of a flexible connection no trouble is encountered.

Further, it is necessary to provide means resiliently urging at least one pair of pulley sections together to maintain the belt under suitable tension to take up belt wear, and particularly since there is a difference in the length of belt required at positions near optimum adjustment compared with positions of intermediate adjustment.

Due to the small movement required to tension the belt, as in the present structure, a spring of much less tension is required than in structures where a spring is relied upon to actually move the pulley section to the maximum diameter. As an example, where a structure of the latter type is used, a spring must have sufficient tension to supply the necessary force against the belt to properly tension it for not only the normal operating load, but, in addition, it must take care of overloads and starting conditions. It is conventional practice to rate drives of this nature when the driving pulley is at the maximum effective diameter. Therefore, a spring must have sufficient force to start a full rated load, which in many cases exceeds 200% of normal full load. Then, when the drive is running at the minimum effective diameter or low speed on the driving pulley, the spring pressure will be greatly increased due to the compression of the spring by the separation of the pulley sections and in drives where the rate between the minimum and maximum diameters exceeds two to one, the pressure against the side walls of the belt becomes excessive and results in short belt life.

The cup 47 is provided with a rack 89 on its outer surface engaged by a pinion 90 formed on a shaft 91 rotatably supported in a boss 92 formed exteriorly of the guide 73. A threaded pin 93 is provided in the boss 92 which by engagement with a groove 94 in the shaft 91 axially supports the shaft. The parts are so proportioned that the shaft 91 is substantially in alignment with the shaft 63 and is coupled thereto by a sleeve 95. The sleeve 95 is arranged to fit over the ends of the shafts 63 and 91, the upper end of the sleeve 95 having diametrical slots 96 engaging a pin 97 in the shaft 63, the lower end of the sleeve 95 having similar slots 98 at right angles with the slots 96 and engaged by a pin 99 carried by the shaft 91. The sleeve 95 permits a certain amount of misalignment between the shafts 63 and 91, and greatly facilitates assembly and disassembly of the transmission. It is to be understood that operation of the control handle 68 simultaneously rotates the shafts 63 and 91 which causes simultaneous movements of the adjusting cups 47 and 48 with resulting simultaneous adjustment of the effective pulley diameters of the pulley structures 6 and 7.

Adequate lubrication of the sliding surfaces of the axially movable members, as adjusting cups 47 and 48 and pulley sections 13 and 30 is important, since these parts frequently remain in one adjusted position for long periods, and it is desirable that they be readily movable when it is desired to change the adjustment. Thus, each cup, 47 and 48, has a shallow circumferential grease groove 130, adapted to register with a radial port 131 in the housing 49 or 73, as the case may be, which is adapted to communicate with the outside of the casing 35 by a passage 132, the outer end of which is closed by an Alemite or similar pressure fitting 133.

The hub 30—a of the pulley section 30 is provided with an interior grease groove 135 for lubricating the surface of the hub 30—a which slides on the sleeve 31, an Alemite or similar fitting 136 permitting lubricant to be supplied to the groove 135. Hub 13—a of the pulley section 13 is similarly provided with a groove 138 for lubricating the surface of the hub 13—a which slides on the sleeve or shaft extension 18. Provisions are made for supplying lubricant to the groove 138 from the exterior of the casing 35. Thus the sleeve 18 has a wall 18—a cooperating with the end of the shaft 3—a to form a chamber 139 which communicates with the groove 138 by one or more ports 140. A tube or pipe 141 is threaded into the wall 18—a and extends through the mandrel 78 which has a through opening 78—a to accommodate it to a point just within the cover 74. The tube 141 has an Alemite or other pressure fitting 142 at its outer end, a removable plug 74—a being provided in the cover 74 to permit access to the fitting. The plug 74—a may be removed at any time and a grease gun used to supply lubricant to the chamber 139, even though the transmission is in operation.

As mentioned previously a differential gear set is interposed between the load driving pulley 7 and the load driving shaft 2. This is necessary when a large reduction in speed between the prime mover or motor 3 and the load driving shaft is required. Furthermore, by appropriate choice of the gear ratio in such a gear set it is possible by adjustment of the speed ratio as determined by the variable diameter pulley structures 6 and 7 to bring the load driving shaft 2 to a stand still while the prime mover is operating at its normal speed or even to cause a reversal in the direction of rotation of the shaft 2.

Figure 6:
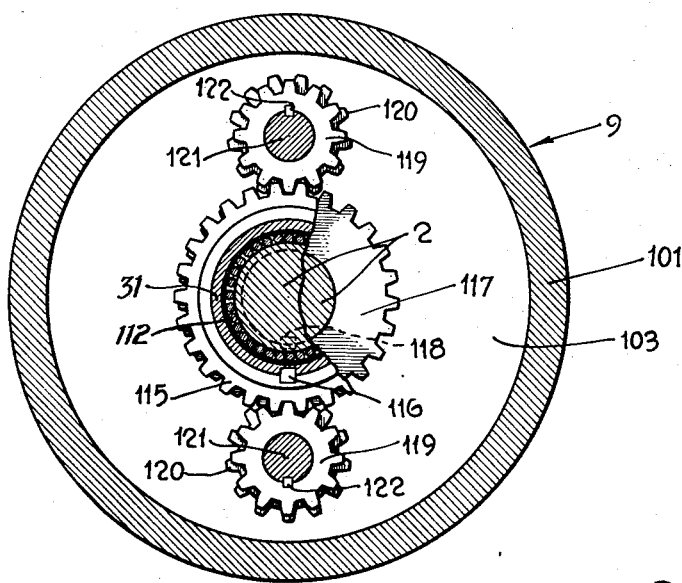

Referring to Figures 4 and 6, the gear set 9 is shown as enclosed in a rotatable housing 101, grooved at 102 for the reception of the belt 10. The housing 101 is provided with a removable cover 103 secured thereto as by screws 104, as well as with an inner wall 105 and is rotatably supported by anti-friction bearings 106 and 107. The outer race 108 of the bearing 106 is secured in a suitable opening in the cover 103, the inner race 109 of this bearing being mounted on the shaft 2. The outer race 110 of the bearing 107 is secured in an opening in the wall 105, the inner race 111 of this bearing being secured on the sleeve 31, which extends through the bearing 107 into the housing 101. The sleeve 31 is rotatably supported on the shaft 2 by needle bearings 112 and 113 adjacent its ends. A control gear 115 is secured on the sleeve 31 within the housing 101 as by a key 116, and a driving gear 117 is secured on the shaft 2 adjacent the gear 115 as by a key 118. The provision of the sleeve 31 for carrying the pulley structure 7 and the rotating element of its control member 33 as well as the control gear 115, makes it possible to extend the load driving shaft 2 entirely across the frame 35 and beyond each end thereof. This has the important advantage of making it possible to connect a load to either side of the transmission. The control gear 115 and the driving gear 117 are respectively engaged by pinions 119 and 120 which are fixed on a shaft 121 by a key 122. The shaft 121 is rotatably supported in the housing 101 by needle bearings 123 and 124 adjacent its opposite ends and mounted respectively on the cover 103 and the wall 105. To make a balanced construction two or more such shafts 121 are provided equiangularly spaced about the shaft 2.

The housing 101 is driven at a constant speed by the motor 3 causing the shafts 121 to revolve around the shaft 2. These shafts are also caused to rotate about their axes by the engagement of pinions 119 with the control gear 115, which is rotated at a speed determined by the adjusted diameters of the pulley structures 6 and 7. Pinions 120 are also rotated with the shafts 121 and the drive shaft 2 by their engagement with the driving gear 117.

I claim:

1. In a variable speed power unit including a frame, a load driving shaft rotatably mounted on said frame, a pulley structure operatively carried by said shaft, said unit being adapted to have a motor mounted on said frame, said motor having a shaft with a variable diameter pulley structure mounted thereon for connection with the pulley structure on said load driving shaft by a belt, said variable diameter pulley structure including a pulley section fixed on said shaft against axial movement and a pulley section relatively axially adjustable with respect thereto, said pulley sections having opposed oppositely inclined belt engaging faces forming by relative axial adjustment variable effective pulley diameters, a member for adjusting said pulley section, means on said frame independent of the motor movably supporting said member, and means adapted to form a flexible connection between said member and said adjustable pulley section and urging said section to move independently of the member.

2. In a variable speed power unit including a frame, a load driving shaft rotatably mounted on said frame, a pulley structure operatively carried by said shaft, said unit being adapted to have a motor mounted on said frame, said motor having a shaft with a variable diameter pulley structure mounted thereon for connection with the pulley structure on said load driving shaft by a belt, said motor having end bearing supports for supporting said motor shaft, said variable diameter pulley structure including a pulley section fixed on said shaft against axial movement and a pulley section relatively axialy adjustable with respect thereto, said pulley sections having opposed oppositely inclined belt engaging faces forming by relative axial adjustment variable effective pulley diameters, means mounted on said frame independently of said motor forming a guide, a member supported in said guide for movement substantially axially of said motor shaft, means for adjustably positioning said member, and resilient means coupling said member and said adjustable pulley section.

3. In a variable speed power unit including a frame, a load driving shaft rotatably mounted on said frame, a pulley structure operatively carried by said shaft, said unit being adapted to have a motor mounted on said frame, said motor having a shaft with a variable diameter pulley structure mounted thereon for connection with the pulley structure on said load driving shaft by a belt, said motor having end bearing supports for supporting said motor shaft, said variable diameter pulley structure including a pulley section fixed on said shaft against axial movement and a pulley section relatively axially adjustable with respect thereto, said pulley sections having opposed oppositely inclined belt engaging faces forming by relative axial adjustment variable effective pulley diameters, a member means mounted on said frame independently of the motor slidably supporting said member for movement substantially axially of said motor shaft, a mandrel rotatably carried by said member substantially coaxial of said shaft and fixed against axial movement in such member, means for adjustably positioning said member, and flexible means transmitting force between said mandrel and said adjustable pulley section.

4. In a variable ratio transmission including a pair of spaced parallel shafts, pulley structures respectively on said shafts operatively connected by a belt, each of said pulley structures including an axially fixed pulley section and a relatively axially movable pulley section, said pulley sections having opposed oppositely inclined belt engaging faces forming by relative axial adjustment variable effective pulley diameters, and means for simultaneously adjusting the movable pulley section of each pulley structure to cause an increase in the effective diameter of one of said structures and corresponding decrease in the effective diameter of the other of said structures, comprising adjusting members supported respectively for axial movement with respect to each of said pulley structures, guide means respectively for said adjusting members, a rotatable element extending through both of said guide means transversely to the axes of said shafts, interengaging means respectively on said element and at least one of its associated guide means normally restraining movement of said element in said guide in the direction of the axis of said element, and optionally operable to release said element for movement in the guide in the direction of said axis, means forming an operative connection between said element and each of said members whereby rotation of said element causes axial movement of said members, and means for rotating said rotatable element.

5. In a variable ratio transmission including a pair of spaced parallel shafts, pulley structures respectively on said shafts operatively connected by a belt, each of said pulley structures including an axially fixed pulley section and relatively axially movable pulley section, said pulley sections having opposed oppositely inclined belt engaging faces forming by relative axial adjustment variable effective pulley diameters, and means for simultaneously adjusting the movable pulley section of each pulley structure to cause an increase in the effective diameter of one of said structures and a corresponding decrease in the effective diameter of the other of said structures, comprising adjusting members supported respectively for axial movement with respect to each of said pulley structures, guide means respectively for said adjusting members, an element rotatably mounted in each of said guide means and extending transversely of the direction of movement of the member carried by said guide means, interengaging means respectively on each of said elements and said guides normally restraining movement of said elements in their respective guides in the direction of the axes of said elements, and optionally operable to release said elements for movement in the guides in the direction of said axes, means operatively connecting each of said elements and the respective member whereby rotation of said elements causes axial movement of the associated members, but permitting free movement of said element with respect to said member in the direction of the axis of the element, means for rotating one of said elements, and means connecting said elements for simultaneous rotation, said means being optionally detachable from said elements to facilitate movement of said elements in the direction of their axes in the guides.

6. In a variable ratio transmission, a driving shaft and a load driving shaft, a sleeve rotatably mounted on said load driving shaft, pulley structures respectively in driving relation to said driving shaft and said sleeve, and operatively connected by a belt, the pulley structure on said sleeve including a pair of relatively axially adjustable pulley sections with opposed oppositely inclined belt engaging faces forming by relative axial adjustment variable effective pulley diameters, means connecting said sleeve and said shaft in driving relation, a control element mounted on said sleeve, means securing said element to said sleeve for rotation therewith but permitting axial movement of the element on said sleeve for adjusting said pulley sections, and means forming a connection between one of said pulley sections and said element.

7. In a variable diameter pulley structure, said pulley structure including a pair of relatively axially adjustable pulley sections with opposed oppositely inclined belt engaging faces, forming by relative axial adjustment variable effective pulley diameters, a rotatable element upon which said sections are mounted, means preventing relative rotation between said element and said sections, at least one of said sections having a surface slideably engaging a surface on said element, whereby said section is axially slideable on said element to adjust the pulley diameter, an adjusting member supported for movement axially of the pulley structure, a tubular mandrel rotatably carried by said member, means operatively connecting said mandrel and said one pulley section to move together, there being a passage in said element to pass lubricant to said surfaces, said element having an extension extending through said mandrel and forming a continuation of said passage accessible from the outside of said adjusting member.

DON HEYER.

REFERENCES CITED

The following references are of record in the file of this patent:

UNITED STATES PATENTS

| Number | Name | Date |
| --- | --- | --- |
| 729,501 | Mathot | May 26, 1903 |
| 2,161,894 | Bishop | June 13, 1939 |
| 2,164,818 | Heyer et al. | July 4, 1939 |
| 2,170,212 | Pfleger | Aug. 22, 1939 |
| 2,202,554 | Heyer et al. | May 28, 1940 |
| 2,205,977 | Heyer | June 25, 1940 |
| 2,207,219 | Heyer | July 9, 1940 |
| 2,215,742 | Reeves | Sept. 24, 1940 |
| 2,257,744 | Heyer | Oct. 7, 1941 |
| 2,281,859 | Reeves | May 5, 1942 |
| 2,293,617 | Myers | Aug. 18, 1942 |
| 2,293,638 | Clarkson | Aug. 18, 1942 |
| 2,298,395 | Lewellen | Oct. 13, 1942 |
| 2,346,868 | Perry | Apr. 18, 1944 |
| 2,356,772 | Magee | Aug. 29, 1944 |

FOREIGN PATENTS

| Number | Country | Date |
| --- | --- | --- |
| 21,377 | Great Britain | Nov. 26, 1900 |
| 323,526 | France | Mar. 9, 1902 |
| 371,362 | Italy | May 20, 1939 |